Sept. 6, 1932.  J. C. FITZPATRICK  1,875,433
SANITARY HOG HOUSE AND PEN
Filed Dec. 15, 1930   2 Sheets-Sheet 1

INVENTOR:
James C. Fitzpatrick,
BY:
Chas W. Gerard
ATTORNEY

Sept. 6, 1932. J. C. FITZPATRICK 1,875,433
SANITARY HOG HOUSE AND PEN
Filed Dec. 15, 1930 2 Sheets-Sheet 2
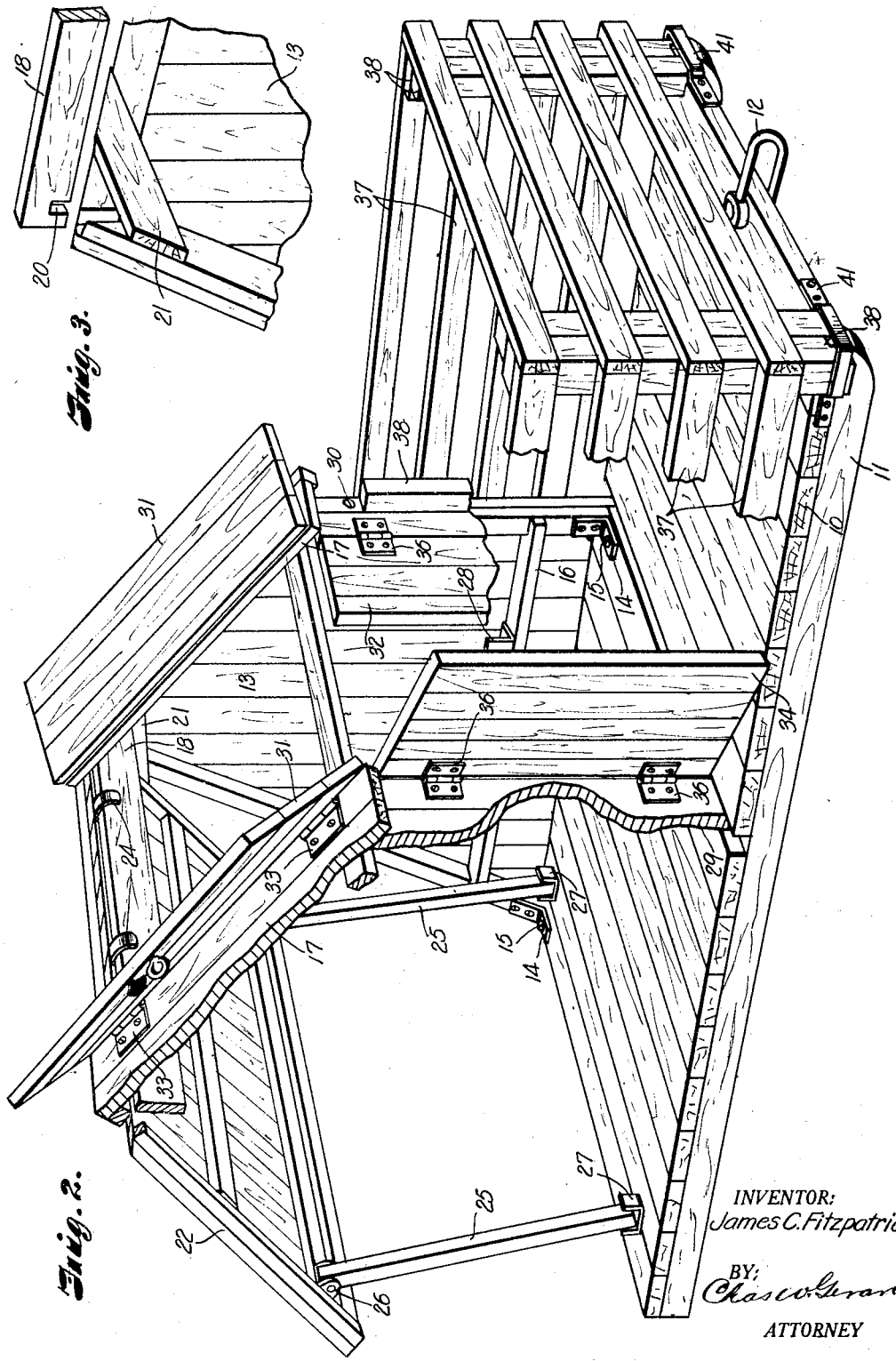
INVENTOR:
James C. Fitzpatrick,
BY
Chas W Gerard.
ATTORNEY Patented Sept. 6, 1932

1,875,433

UNITED STATES PATENT OFFICE

JAMES C. FITZPATRICK, OF HIGGINSVILLE, MISSOURI, ASSIGNOR OF ONE-FOURTH TO MARY FITZPATRICK AND ONE-FOURTH TO NAOMI FITZPATRICK, BOTH OF HIGGINSVILLE, MISSOURI

SANITARY HOG HOUSE AND PEN

Application filed December 15, 1930. Serial No. 502,458.

The present invention relates to farm equipment, and aims to provide an improved pen and shelter construction for the farrowing of pigs with a view to properly confining the farrowing hog and her litter during the farrowing period, with the purpose of protecting the litter against contamination by contact with the impurities and infections to which they are exposed in the conditions prevailing with the usual barn floors or barn yards as ordinarily maintained.

In accordance with my invention, I provide a pen and house construction equipped with a common floor and adapted to be transported from one point to another, as from the barn or barnyard to a pasture lot, the improved construction providing communication between the open pen and a closed shelter, and also having provision for all necessary ventilation as well as regulation of shade and sunlight, and for permitting the cleaning of both the pen and shelter house and supply of the necessary bedding material from time to time, in a convenient manner.

It is also sought to provide a construction of a knock-down character, permitting it to be manufactured and transported in compact form, and readily assembled at the place of use.

With the foregoing general objects in view, as well as minor objects as will appear in the course of the detailed specification, the invention will now be described by reference to the accompanying drawings illustrating one practical and efficient embodiment of the proposed improvement, after which those features deemed to be novel will be set forth and claimed.

In the drawings—

Figure 1 is a perspective view illustrating a hog house and pen constructed in accordance with my invention;

Figure 2 is a similar view with various parts of the shelter equipment in different positions, for regulation of the air and sunlight conditions, and other portions broken away.

Figures 3 and 4 illustrate details hereinafter referred to.

Figures 1, 4:
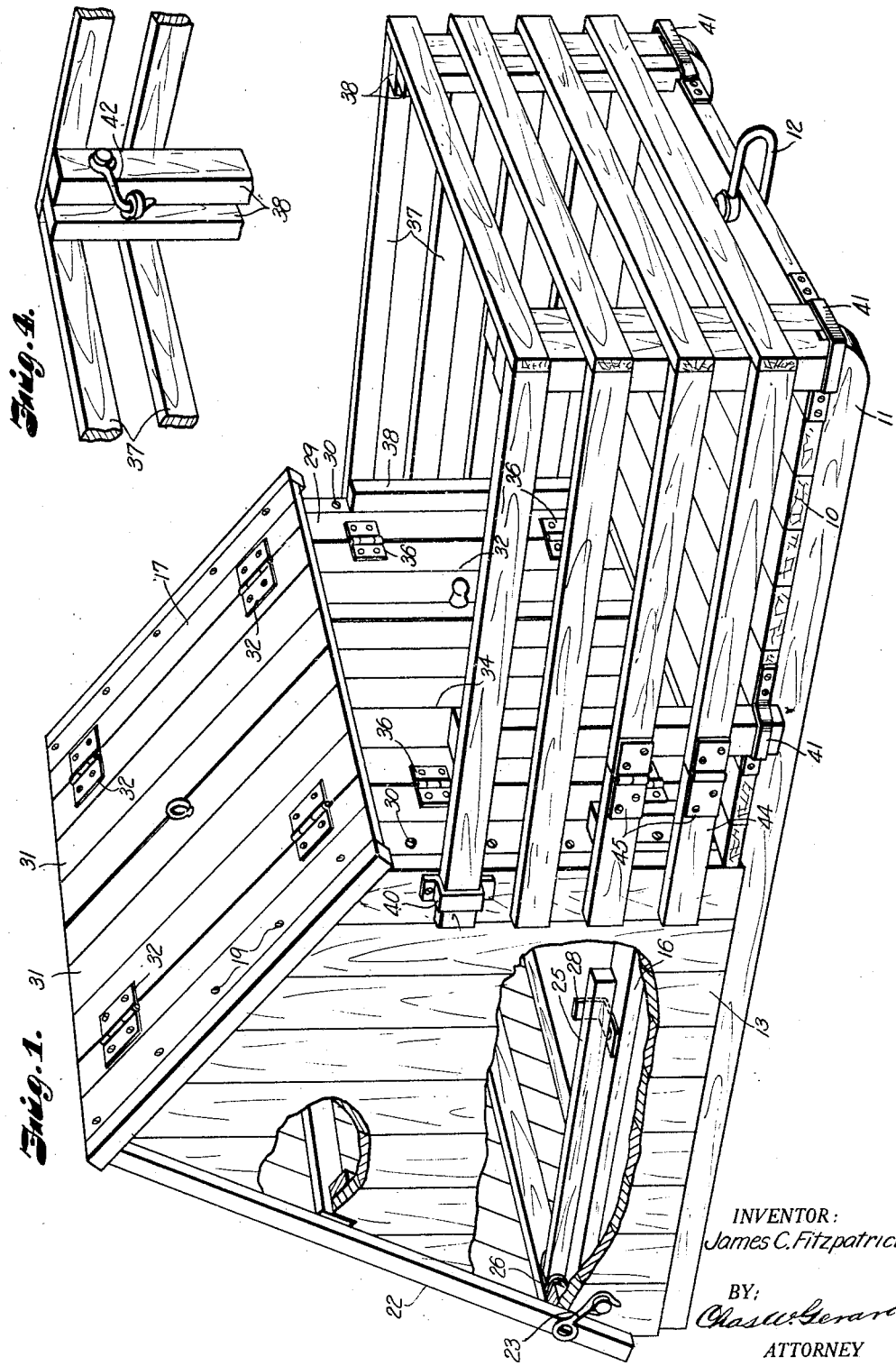

It is well known that the conditions prevailing about the average farm and farm lot are far from ideal as regards their sanitary character, and a truly sanitary condition, free from all contamination and safe for the proper breeding of hogs, is at the best difficult to maintain. As a result, the average hog lot and shelter are alive with infectious parasites, from which each new litter of pigs is in constant danger of infection, because of constant exposure to contact and contamination by the surrounding filth in which these impurities abound. A step has been made in the right direction by providing individual farrow pens, and keeping the hog and its litter confined in such pens, but this protection is interrupted whenever the animals are removed for transport from one point to another, as in going to and from a pasture lot.

For correcting these conditions, I provide a combination pen and shelter house adapted to be assembled in a unitary construction, as a permanent home for the hog and its litter during the farrowing period, by virtue of its portable nature enabling it to be hauled from one point to another, while serving all the needs of the animals throughout the period involved.

Referring now to the drawings in detail, I illustrate therein a combination house and pen construction, which comprises an extended flooring 10 one section of which is designed to serve as the floor of the shelter house, and the remainder as the floor for the open pen. The flooring is mounted upon suitable sills 11 adapted to serve as sled runners for hauling the entire assembly from place to place, as by means of a clevis member 12 to which any desired form or hitch may be made.

For the shelter construction two sidewall members 13 are provided, which may be maintained in upright position by any suitable means, such as brackets 14 at the lower corners of said members, and having screws 15 for attachment to the flooring 10. The horizontal frame pieces 16 of these wall members 13 are at a suitable height, not over six inches above the flooring 10, to avoid injury to the litter by being jammed beneath said frame 16. At the top, the wall members are connected by a ridge pole 18 formed with suitable terminal notches 20 for engagement with the top cross pieces 21 of the wall members.

For providing a suitable swinging canopy, adapted to serve as a combination closure and sunshade and ventilating member, I employ an inclined swinging wall or canopy member 22 supported by the correspondingly inclined margins of the wall members 13, and suspended for swinging movement by means of pivot hooks 24 engaged with the upper edge of the ridge pole 18. The canopy member 22 is adapted to be supported in raised position by means of props 25 pivoted, as indicated at 26, to said member 22 and adapted to be supported in pockets 27 at the outer ends of the frame members 16. In the closed position of the canopy member 22, said props 25 are rested upon the horizontal frame members 16, and retained thereon by cleats 28. Latches 23 are carried by the lower corners of the member 22 for securing it in closed position.

Supported by the wall members 13 in oppositely inclined position is a roof member 17 held in place by screws 19 and provided with a pair of doors 31 adapted to swing on hinges 33, as shown in Figure 2.

Across the front sides of the wall members 13 is provided a wall frame 29 held in place by means of screws 30 and carrying two swinging doors, a small door 31 and a larger door 34 mounted on hinges 36, for providing proper communication between the interior of the shelter house and the exterior pen.

The enclosure for the open pen is provided in the form of ordinary fencing construction mounted upon the flooring 10 outside the shelter house, and comprising the usual horizontal rails 37 carried by posts 38. The rear ends of the top rails 37 of the side frame members are supported in strap loops 40 carried by the wall members 13, while similar strap loops 41 are provided for mounting the lower ends of the posts 38. The posts at the outer corners of the pen are detachably secured together by means of latches 42. One of the side fencing sections is also provided with a small gate 44 adapted for movement on hinges 45, for passage of the hogs in going to and from the pen.

In the use of the combination pen and shelter house, as above described, the hog at the time of farrowing is confined therein, and so confined during all the time she and her litter are on the barnyard premises. In this way the animals are kept entirely out of contact with the ground or floor of the premises, and thus protected from any contamination whereby they might become infected with dangerous parasites or other infections to which they would otherwise be exposed. At the same time the flooring 10 of the pen and shelter may be readily cleaned and bedded and kept in a thoroughly sanitary condition, the interior being readily accessible to the farm hand, and the portability of the construction enabling it to be placed wherever it is most convenient to feed and other supplies.

When it is desired to move the structure from one point to another, as in putting the animals out to a pasture lot, this is done by simply hitching onto the connection 12 and hauling the entire outfit to the new location; here the animals may be allowed free movement into and out of the structure, and the swinging roof member 22 left propped up, to afford both a shelter and shading canopy as illustrated in Figure 2. Besides this the various doors 31, 32 and 34 may be opened for proper regulation of light and air circulation at all times.

It is thus apparent that a practical and highly efficient arrangement and construction have been devised for providing a combination hog shelter and pen for the purpose of maintaining wholesome and sanitary living conditions for the hog and its litter at all times, since the animals are constantly confined to an environment where the proper conditions may be preserved with a minimum of effort and attention on the part of the owner. The construction is well adapted for economical manufacture in parts or sections which can be shipped or transported in a knock-down condition and thereafter conveniently set up and assembled ready for use.

While I have illustrated and described what I now regard as the preferred form of construction and arrangement for the embodiment of my improvement, I desire to reserve the right to make whatever changes or modifications may fairly fall within the scope of the appended claim.

What I claim is:

A combination house, shelter and pen of knock-down construction comprising a unitary flooring member and framework providing a combination hog shelter house and pen in communication with each other and utilizing the top of said flooring member as a common floor surface for the shelter house and pen, the house portion of said framework having a removable ridge pole, and a swinging combination wall and roof member having hook elements removably engaging said pole and pivotal prop members for supporting said swinging member in raised position to serve as an open shelter member.

In witness whereof I hereunto affix my signature.

JAMES C. FITZPATRICK.